R. M. BERRY.
Sewing Machine.
No. 1,073.
Reissued Nov. 13, 1861.
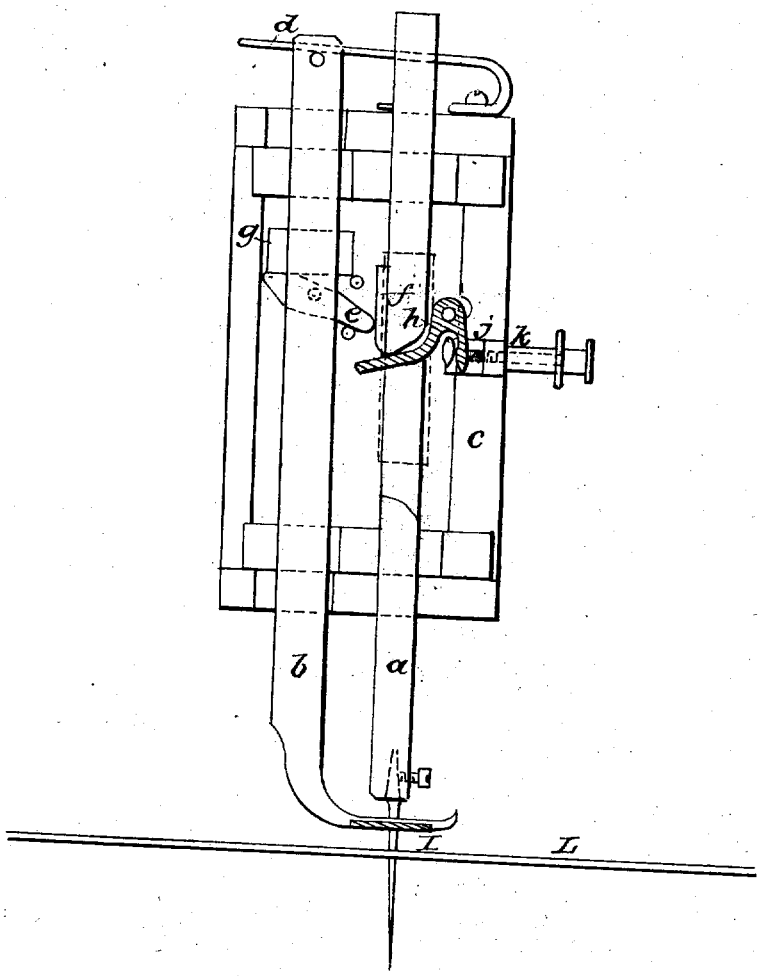
N. PETERS, Photo-Lithographer, Washington, D. C.

UNITED STATES PATENT OFFICE.

ROBERT M. BERRY, OF NEW YORK, N. Y.

IMPROVEMENT IN SEWING-MACHINES.

Specification forming part of Letters Patent No. 22,225, dated December 7, 1858; Reissue No. 1,073, dated November 13, 1860.

*To all whom it may concern:*

Be it known that I, ROBERT M. BERRY, of the city, county, and State of New York, have invented a certain new and useful Improvement in Sewing-Machines; and I do hereby declare that the following is a full, clear, and exact specification thereof, reference being made to the annexed drawing, making a part of said specification, and which is an end elevation exhibiting the table upon which the cloth rests, the needle-bar, the feeding-foot, and the parts which operate said foot being substantially such as described in Letters Patent of the United States to me heretofore issued, and bearing date of July 6, 1858.

In sewing-machines of usual construction a difficulty is found in feeding the material to be sewed, particularly when it is thin or glazed or of delicate texture. Theoretically, a joint action of two metallic smooth surfaces, one of which is stationary and the other moving, should effect the feed, yet in practice it has been found necessary to have the moving surface roughened. The roughened surface may be satisfactory in feeding thick and heavy materials, but on delicate textures it is deficient for the reason that however minute the roughening marks or points may be, they still do not correspond with the threads or other irregularities of surface of the material to be sewed, nor is the material thick enough to permit of the points being impressed upon it other than by actually penetrating it, and hence the length of stitch is not certainly uniform. These objections I obviate by making the moving surface of a substance, which, while it is smooth generally, is also so far yielding that the minute irregularities of surface of the fabric to be fed along may be pressed into it by the feeding-foot, and thus it becomes, as it were, a roughened surface, when in action, exactly corresponding to the character of the fabric. Leather, india-rubber, &c., have been proposed as suitable substances for forming the moving surface with a view to this particular action; but these have failed to operate for the reason that their surface does not long retain its normal condition, but soon becomes impaired in consequence of the small filaments worn off the fabric remaining attached or embedded, and then the surface ceases to act.

My invention consists in the discovery and employment for the moving surface of the ordinary cork-wood of commerce, and one method in which I employ it as a feed-surface is as follows:

The parts represented at *a*, *b*, *c*, *d*, *e*, *f*, and *g* are all described in my aforesaid Letters Patent of 1858. At *h* is a double-acting cam-lever for causing the feeding-foot *b* to move laterally at the proper times. At J is a recess in which the short end of the lever *h* is held, and at *k* is a set-screw by which the extent of the motion of *h* is controlled.

The smooth surface of the table, upon which the material to be sewed is to progress is shown at L, and this should be of metal.

I represents a surface of cork, cut smoothly to appropriate shape, and affixed upon the under side of the foot *b*. When the machine is put in motion, an ordinary feeding action will be given to the feeding-foot, a proper pressure being afforded by its spring *d*. The peculiarity of the cork surface is that it does not take upon it permanently any portion of the fabric, and thus while it is in fact a smooth surface it is still of such different frictional character from the other and stationary surface, which, as described, is of smooth metal, that by the joint action of the two surfaces I and L even the most delicate texture will be accurately fed along.

I claim—

Forming the moving feeding-surface of the material cork, (or its equivalent,) for the purpose and in the manner substantially as described.

ROBT. M. BERRY.

Witnesses:
I. P. PIRSSON,
S. H. MAYNARD.